United States Patent
Deotte

(10) Patent No.: US 10,946,580 B2
(45) Date of Patent: Mar. 16, 2021

(54) MICROPOROUS MEMBRANE FOR STEREOLITHOGRAPHY RESIN DELIVERY

(71) Applicant: LAWRENCE LIVERMORE NATIONAL SECURITY, LLC, Livermore, CA (US)

(72) Inventor: Joshua R. Deotte, Livermore, CA (US)

(73) Assignee: Lawrence Livermore National Laboratory, LLC, Livermore, CA (US)

( * ) Notice: Subject to any disclaimer, the term of this patent is extended or adjusted under 35 U.S.C. 154(b) by 48 days.

(21) Appl. No.: 16/352,451

(22) Filed: Mar. 13, 2019

(65) Prior Publication Data
US 2019/0210276 A1 Jul. 11, 2019

Related U.S. Application Data

(62) Division of application No. 14/919,408, filed on Oct. 21, 2015, now Pat. No. 10,286,600.

(51) Int. Cl.
*B29C 64/135* (2017.01)
*B29C 64/124* (2017.01)
*B29C 64/112* (2017.01)
*B29C 64/386* (2017.01)
*B33Y 10/00* (2015.01)
(Continued)

(52) U.S. Cl.
CPC .......... *B29C 64/135* (2017.08); *B29C 64/112* (2017.08); *B29C 64/124* (2017.08); *B29C 64/386* (2017.08); *B33Y 10/00* (2014.12); *B33Y 30/00* (2014.12); *B33Y 50/02* (2014.12); *B33Y 70/00* (2014.12)

(58) Field of Classification Search
CPC .... B29C 64/135; B29C 64/124; B29C 64/112
See application file for complete search history.

(56) References Cited

U.S. PATENT DOCUMENTS

| 4,575,330 A | 3/1986 | Hull |
| 4,578,155 A | 3/1986 | Halliwell et al. |
| (Continued) | | |

FOREIGN PATENT DOCUMENTS

JP 2005281337 10/2005

OTHER PUBLICATIONS

Dowding et al., "Production of Porous Suspension Polymer Beads with a Narrow Size Distribution Using a Cross-Flow Membrane and a Continuous Tubular Reactor," Colloids and Surfaces A: Physiochemical and Engineering Aspects, vol. 1, No. 80, 2001, pp. 301-309.
(Continued)

*Primary Examiner* — Joseph S Del Sole
*Assistant Examiner* — Melody Tsui
(74) *Attorney, Agent, or Firm* — Eddie E. Scott

(57) ABSTRACT

A system for building a structure. The system includes a reservoir; an immiscible fluid in the reservoir; a membrane operatively connected to the reservoir; channels and delivery ports in the membrane; a microliter amount of curable resin; a delivery system for delivering the microliter amount of curable resin to channels and delivery ports in the membrane and to the reservoir in contact with the immiscible fluid in the reservoir; and an energy source adapted to deliver energy to the reservoir onto the microliter amount of curable resin for building the structure.

1 Claim, 8 Drawing Sheets

(51) Int. Cl.
  *B33Y 30/00*   (2015.01)
  *B33Y 50/02*   (2015.01)
  *B33Y 70/00*   (2020.01)

(56) References Cited

U.S. PATENT DOCUMENTS

| | | |
|---|---|---|
| 4,961,154 A | 10/1990 | Pomerantz et al. |
| 5,122,441 A | 6/1992 | Lawton et al. |
| 5,248,456 A * | 9/1993 | Evans, Jr. ............ B29C 64/357 |
| | | 264/401 |
| 5,476,744 A | 12/1995 | Anno |
| 5,573,721 A | 11/1996 | Gillette |
| 7,088,432 B2 | 8/2006 | Zhang |
| 8,034,526 B2 | 10/2011 | Watanabe |
| 8,309,851 B2 | 11/2012 | Abe et al. |
| 8,568,628 B2 | 10/2013 | Norikane et al. |
| 2002/0195748 A1 | 12/2002 | Farnworth |
| 2006/0192312 A1 | 8/2006 | Whlstrom |
| 2009/0261287 A1 | 10/2009 | Withey |
| 2010/0096159 A1 | 4/2010 | Abe |
| 2012/0175798 A1 | 7/2012 | Fukuda |
| 2013/0304233 A1 | 11/2013 | Dean et al. |
| 2014/0264984 A1 | 9/2014 | Kosvintsev |
| 2014/0339741 A1 | 11/2014 | Aghababie |
| 2015/0309473 A1 * | 10/2015 | Spadaccini ............ B29C 64/135 |
| | | 359/3 |
| 2016/0319232 A1 | 11/2016 | Noritomi |
| 2017/0136693 A1 | 5/2017 | Okamoto |
| 2017/0173871 A1 | 6/2017 | Ermoshkin |

OTHER PUBLICATIONS

Low et al, "Perspective on 3D Printing of Separation Membranes and Comparison to Related Unconventional Fabrication Techniques," J. of Membrane Science, vol. 523, 2017, pp. 596-613.

Omi et al., "Synthesis of Polymeric Microspheres Employing SPG Emulsification Technique," Journal of Applied Polymer Science, vol. 51, 1994, pp. 1-11.

Madisavljevic et al., "Recent Developments in Manufacturing Emulsions and Particulate Products Using Membranes," Advances in Colloid and Interface Science, vol. 113, 2005, pp. 1-20.

Wolska et al., "Preparation of Poly(styrene-co-divinylenzene) Microspheres by Membrane Emulsification," Desalination, vol. 241, 2009, pp. 331-336.

* cited by examiner

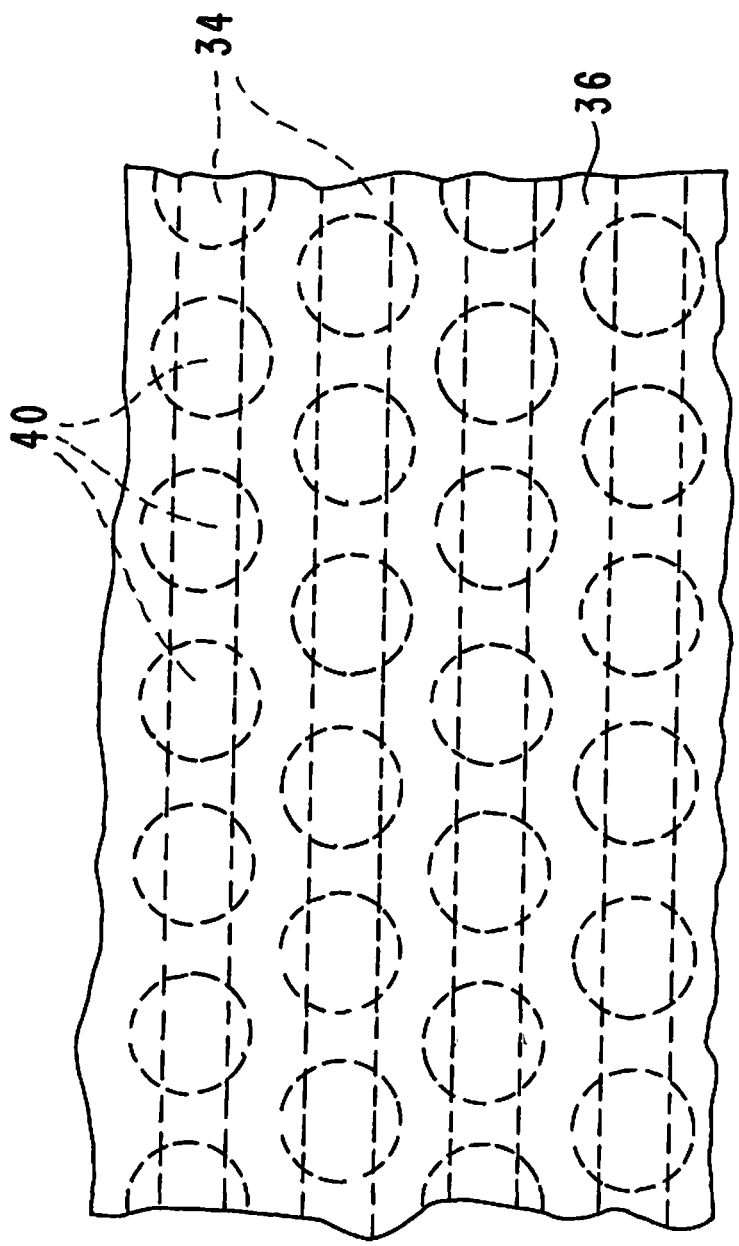

MICROPOROUS MEMBRANE FOR STEREOLITHOGRAPHY RESIN DELIVERY

CROSS-REFERENCE TO RELATED APPLICATIONS

The present application is a Division of application Ser. No. 14/919,408 filed Oct. 21, 2015, the disclosure of which is hereby incorporated by reference in its entirety for all purposes.

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to stereolithography additive manufacturing.

State of Technology

This section provides background information related to the present disclosure which is not necessarily prior art.

Additive manufacturing (AM) systems allow direct translation of software models into physical objects. AM systems follow a basic principle: generate three-dimensional structures from sequential two-dimensional patterns. Many different methods exist, such as laser sintering metals, photo-patterning polymers, or photo curing printed resins. Originally used for rapid prototyping, AM systems are increasingly used to fabricate operational components, particularly when desired geometry is too complicated for traditional machining approaches or only a low number of units are required.

Projection stereolithography is a polymer AM technology that uses dynamic photo masks to sequentially project two-dimensional cross sections of a three-dimensional structure into a photo curable resin. The desired structure is first generated using desktop computer aided design (CAD) software or other computational means and converted to a model file format. The model file is then processed by the system control software, which generates a series of two-dimensional cross sectional images at periodic intervals along the structure. The controller then projects these images with an ultraviolet projector onto a photosensitive resin, solidifying the pattern. After the layer is fully cured, the structure is lowered by a mechanical stage into the resin, allowing the resin to cover the top of the structure so the next layer can be patterned.

Polymer-based AM techniques are increasingly used to fabricate custom-made soft devices and biological research platforms. The high-resolution capability of SL systems and use of compliant polymers allows for the creation of highly specific devices, such as custom-fit ear buds. In biological research, three-dimensional hydrogel constructs provide an environment that closely mimics the native environment of cells, making it an attractive platform for studying cell interactions. For tissue engineering applications, AM systems can create scaffolds in the shape of missing structures, such as noses or ears. In many of these instances, the resin is highly specialized and not readily available, either due to low available supply (i.e. from patients) or high cost, so minimizing wasted resin is a priority.

The method for handling resin is central to improving process throughput and reducing material waste. Projection stereolithography systems project a photopattern onto a bath of resin covered by an ultraviolet transparent membrane. This membrane also serves a dual purpose of allowing oxygen to pass, inhibiting polymerization in a thin film at the interface with the resin to prevent adhesion between the cured layer and the membrane. Nonetheless, a certain suction force still exists when the part is pulled away from the membrane between layers, potentially deforming the part, delaminating the last layer, or detaching the whole part from the moving stage. In the case of high-speed printing, this suction force can become disruptive to membrane alignment and part stability.

The projection stereolithography approach is both high-resolution and high-speed, with speed limited only by resin cure time and movement of the mechanical stages. It is desirable for improved fabrication speed to efficiently manipulate the resin to minimize the translation required of the stage. Furthermore, projection stereolithography systems are usually constrained to a single material type, limiting potential applications. Improving the resin handling system will allow for multiple materials during fabrication, opening up new possibilities in tissue engineering and mechanical applications.

Present SL solutions provide a high-resolution method of patterning polymer structures. However, the resin-handling systems do not allow flexibility in material selection or composition, limit fabrication speed, and require large volumes. A system that addresses these shortcomings would expand the capabilities of existing projection stereolithography technology and enable new applications.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

Stereolithography is a method of fabricating high-resolution 3D models in photopolymer resins. However, most stereolithography systems are limited to a single material or require lengthy steps between layers to change materials. The inventor's apparatus, system, and method allows for rapidly switching resins without lengthy material processing steps and enables continuous, real-time changes in material throughout printing. Furthermore, the inventor's apparatus, system, and method will enable printing with high-viscosity resins.

The inventor's apparatus, system, and method is a system for building a structure that includes a reservoir; an immiscible fluid in the reservoir; a membrane operatively connected to the reservoir; channels and delivery ports in the membrane; a microliter amount of curable resin; a delivery system for delivering the microliter amount of curable resin to channels and delivery ports in the membrane and to the reservoir in contact with the immiscible fluid in the reservoir; and an energy source adapted to deliver energy to the reservoir onto the microliter amount of curable resin for building the structure.

The inventor's apparatus, system, and method have use in fabricating structural hydrogels. Hydrogels provide a 3-dimensional cell culture environment that can closely mimic in vivo tissue properties. For many cells, the stiffness of the matrix can change viability and even functionality. The inventor's apparatus, system, and method allows for the creating of structural components within the hydrogel to control the macroscopic stiffness of the gel without requiring chemical changes. Because the proposed membrane can switch materials during fabrication, the structural and cell-laden components could be fabricated in an automated manner with a single process. Furthermore, the delivery method can be made fully enclosed which will help maintain sterility, particularly in non-sterile production environments.

The inventor's apparatus, system, and method also have use in printing high-viscosity composites. New feedstocks are required to enhance the usefulness of stereolithography and many of these new materials have a high viscosity in their resin form. Notably, nanoparticle composites can have a viscosity several orders of magnitude greater than water. The inventor's apparatus, system, and method uses a fully enclosed delivery system up to the polymerization interface, allowing the resin to be driven at high pressures. These highly-loaded suspensions can then by sintered and densified to produce structures from the nano-composite material that otherwise would not be possible.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

FIGS. 1A through 1F are schematic depictions illustrating one embodiment to the inventor's additive manufacturing apparatus, systems, and methods.

DETAILED DESCRIPTION OF SPECIFIC EMBODIMENTS

Figure 1A:
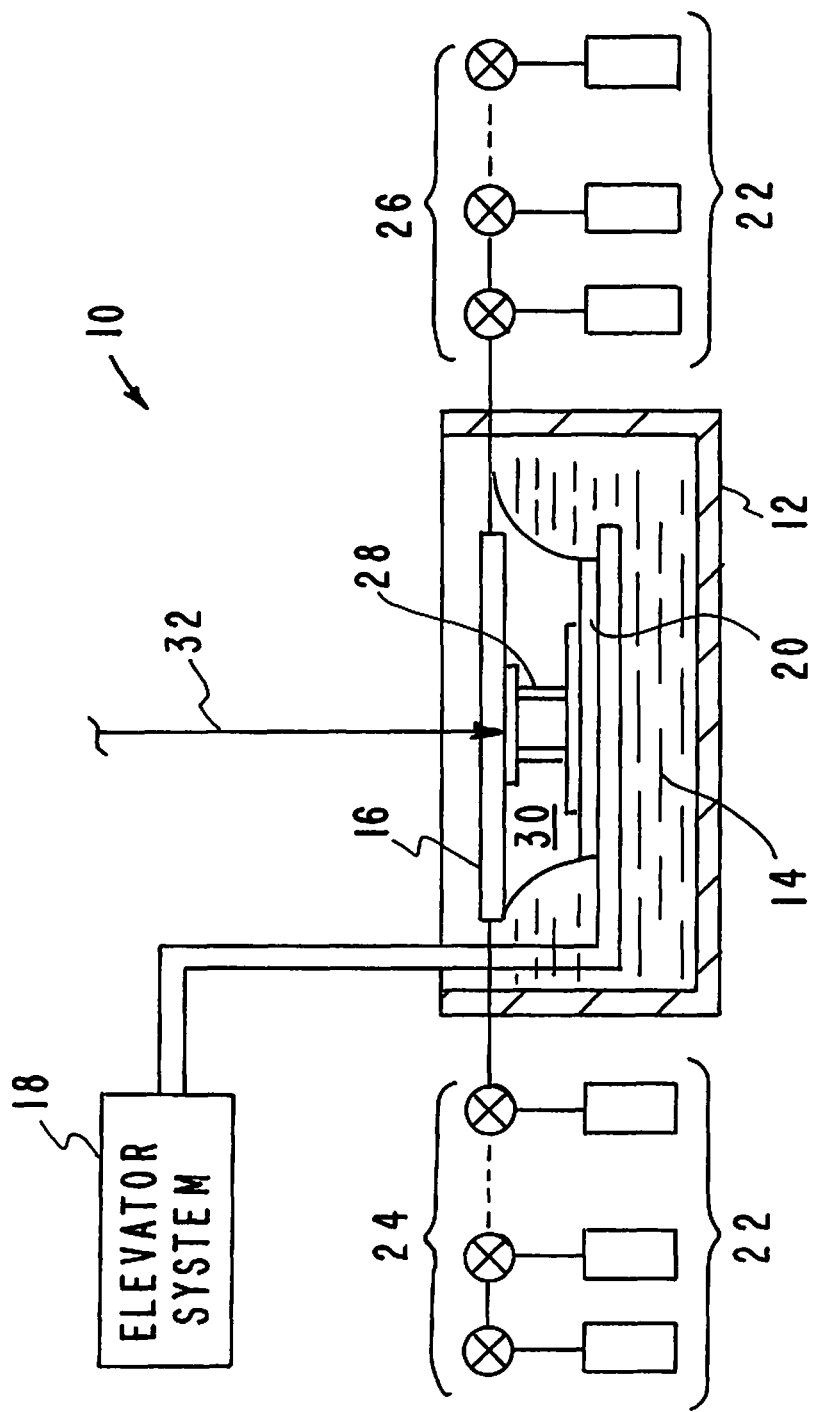

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Stereolithography (SL) has been in commercial use for several decades now. While resolution and speed have improved, the majority of systems are limited to a single resin during fabrication. There have been a few attempts to surpass this obstacle, mainly involving the use of separate baths for each resin or using a wiper arm method for high-viscosity resins. Fundamentally, these approaches are slow because they require inefficient material switching methods between each layer.

The inventor's apparatus, system, and method allows for rapid, continuous material changes throughout the part fabrication without requiring a pause in the printing process. Furthermore, the proposed designs can be adapted to a continuous printing process to achieve extremely fast printing speeds. Because the proposed method delivers material across the polymerization interface, system size becomes less important since the size of the membrane can be increased to compensate.

Referring to the drawings and in particular to FIGS. 1A through 1F one embodiment of the disclosed additive manufacturing apparatus, systems, and methods is illustrated. This embodiment is designated generally by the reference numeral 10. The apparatus, system, and method 10 allows for rapidly switching resins without lengthy material processing steps and enables continuous, real-time changes in material throughout printing. Furthermore, apparatus, system, and method 10 will enable printing with high-viscosity resins.

The apparatus, system, and method 10 utilize modification of an existing SL system with an oxygen-permeable membrane with patterned microchannels. The membrane is around 1 mm thick and the channels have a cross section of around 50 um×100 um. These channels are narrow to allow diffusion of oxygen to prevent polymerization within the channels. Furthermore, the channels are overlaid in such a way that the UV mask image passes through the same thickness of material at all points. Alternatively, software correction is employed so that the whole fabrication area receives the same UV flux.

The channels are connected to an external pumping system and terminate in an array of around 10 um holes spaced around 50 um apart. This array of holes covers the entire build area. The microfluidic membrane is placed between the UV mask source and the build substrate and positioned carefully so the bottom of the membrane is aligned at the focal plane of the UV mask image. As the part is fabricated, the substrate is moved away from the membrane. For low viscosity fluids, the resulting suction is sufficient to pull new material through the array of pores. Higher viscosity fluids will be actively pumped through the membrane.

FIGS. 1A through 1F provide schematic depictions illustrating the additive manufacturing apparatus, systems, and methods 10. FIGS. 1A through 1F show the structural elements identified and described below.

Reference numeral 10—membrane stereolithography with microfluidic resin delivery system.
Reference numeral 12—reservoir.
Reference numeral 14—immiscible fluid (oil/aqueous solution).
Reference numeral 16—membrane (optically transparent and porous to gasses including oxygen).
Reference numeral 18—elevator system.
Reference numeral 20—substrate.
Reference numeral 22—supply build material.
Reference numeral 24—inlet valves.
Reference numeral 26—outlet valves.
Reference numeral 28—object under construction.
Reference numeral 30—puddle of build material.
Reference numeral 32—image projection beam.
Reference numeral 34—channels.
Reference numeral 36—top surface.
Reference numeral 38—bottom surface.
Reference numeral 40—delivery pores.

The structural elements of the system 10 having been identified and described, the operation of the system 10 will now be considered. The system 10 is a stereolithography system for making a solid object by successively printing thin layers of a UV curable material, one on top of the other. A 3-D CAD system creates a model which is sliced into layers. The first layer is sent to a projection system and subsequently projected to the appropriate location as image on the build plane. A programmed movable spot beam of UV light shining on a surface or layer of UV curable liquid is used to form a solid cross-section of the object at the surface of the liquid. The object is then moved, in a programmed manner, away from the liquid surface by the thickness of one layer and the next cross-section is then formed and adhered to the immediately preceding layer defining the object. This process is continued until the entire object is formed.

FIG. 1A illustrates the membrane stereolithography with microfluidic resin delivery system (MSMRD) 10 in its basic form. The system 10 has a reservoir 12 that is filled with an immiscible fluid 14 (oil or aqueous solution). An elevator system 18 positions a substrate 20 within the fluid 14 filled reservoir 12. A build materials 22 are delivered through valves 24 to the membrane 16. A puddle 30 of build material 22 that has been injected into the reservoir 12 has accumulated. The build material 22 will not mix with the immiscible fluid 14 so it forms a puddle 30 that floats on the fluid 14. The elevator system 18 has positioned the substrate 20 to a position that forms a thin (5-10 µm) layer of build material 22. Membrane 16 is an oxygen permeable membrane that allows oxygen to enter the system. The oxygen prevents the build material 22 from sticking to the membrane 16. The excess build material 22 is withdrawn through valves 26. A projected image 32 from a stereolithography system (not shown) passes through the membrane 16 onto the build material 22. The projected image 36 passes through the optically transparent membrane 16 and creates the layers of an object 28 being formed from build material 22.

Figure 1B:
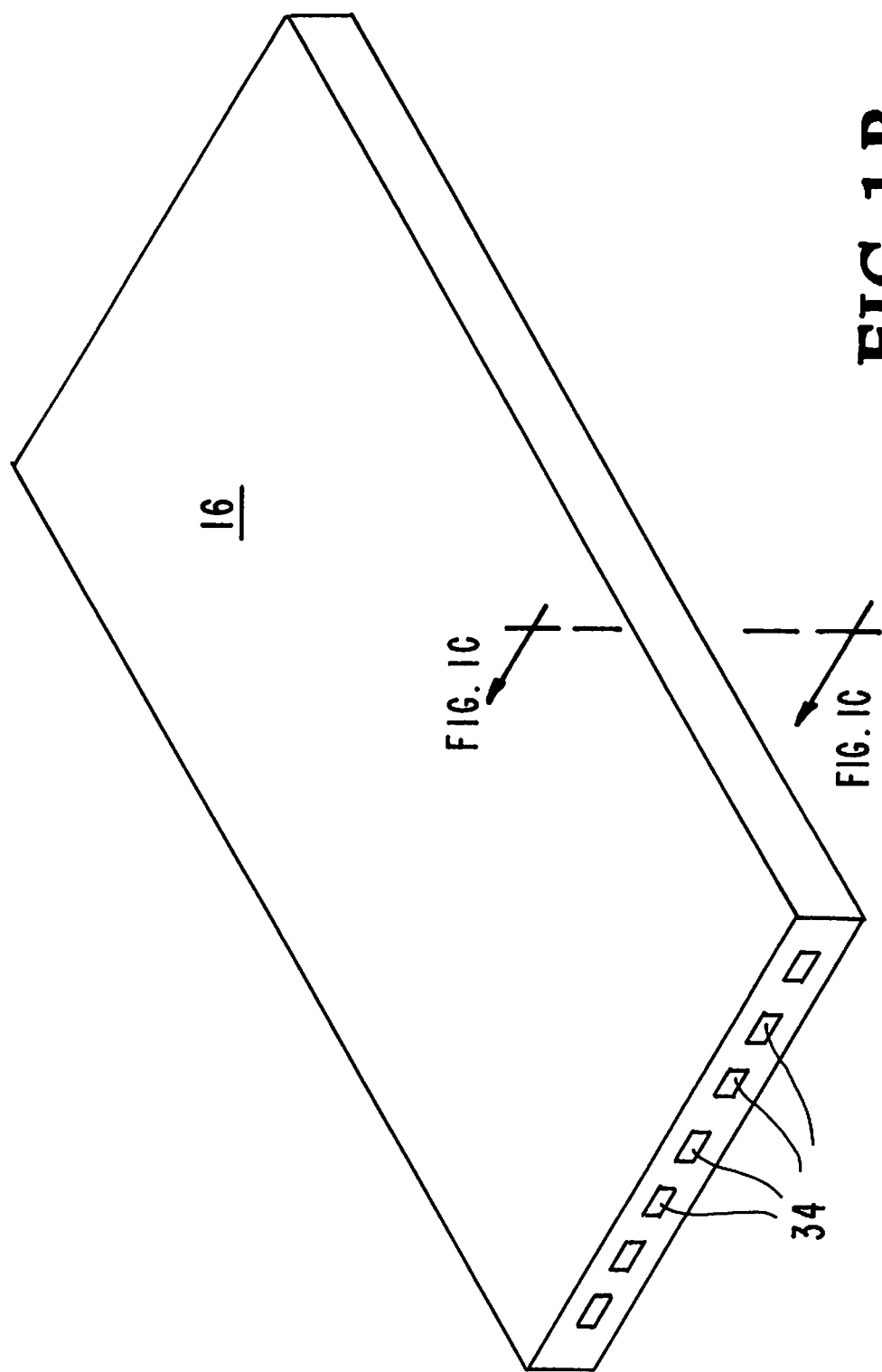

FIG. 1B shows the membrane 16 in greater detail. The membrane 16 is an oxygen permeable membrane that allows oxygen to enter the system. The membrane 16 is also transparent to the ultraviolet light that projects the image of the object 28 being formed. The membrane 16 includes channels 34 that allow the build material 22 to be uniformly distributed to form the layers of the object 28 being formed.

Figure 1C:
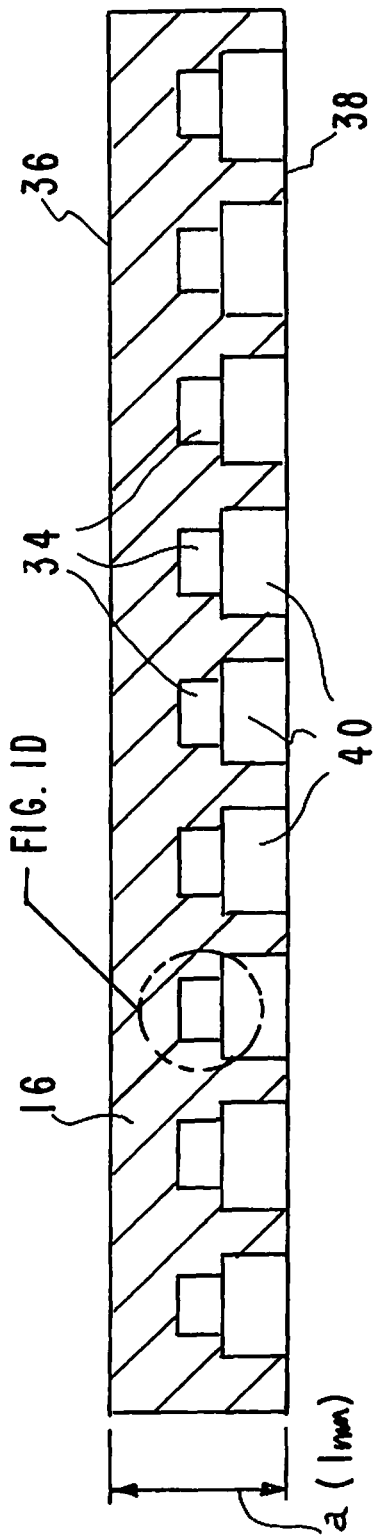

FIG. 1C is an enlarged cross section view of the membrane 16 showing the top surface 36, the bottom surface 38, channels 34 and delivery pores 40. The channels 34 are connected to the delivery pores 40. This allows the build material 22 to be uniformly distributed to form the layers of the object 28 being formed.

Figure 1D:
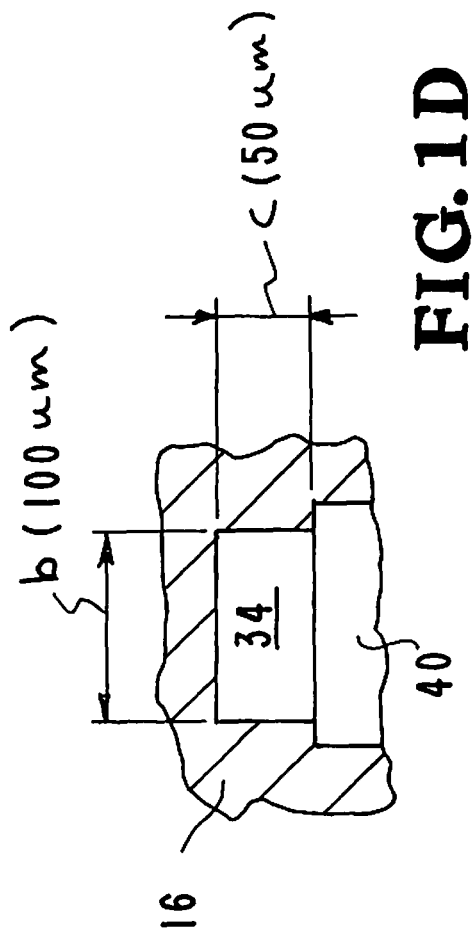

FIG. 1D is an enlarged cross section view of a portion of the membrane 16 showing one of the channels 34 and a delivery pore 40. The channel 34 has a diameter "b" and a depth "c." The diameter "b" is around 100 µm. The depth "c" is around 50 µm. The channel 34 is connected to the delivery pore 40.

Figure 1E:
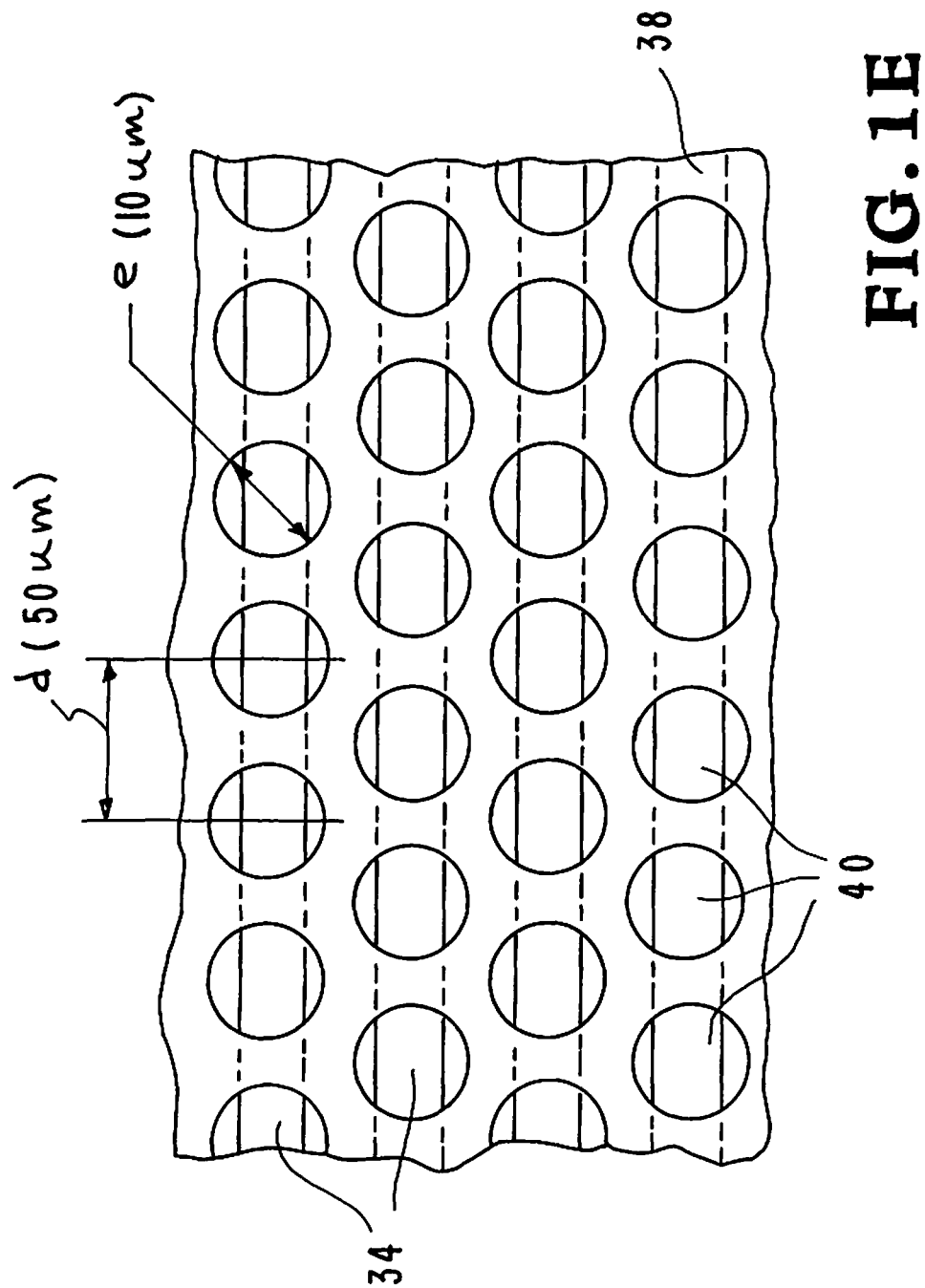

FIG. 1E is a bottom view of the membrane 16 showing the bottom surface 38, the delivery pores 40 in the bottom surface 38 and the channels 34. The channels 34 are connected to the delivery pores 40. The build material 22 flows through the channels 34 to the delivery pores 40 and from the delivery pores onto the object being constructed. The channels 34 and the delivery pores 40 allow the build material 22 to be uniformly distributed to form the layers of the object being formed. The distance "d" between centers of the channels 34 is around 50 µm. The diameter of the delivery pores "e" is around 10 am.

FIG. 1F is a top view of the membrane 16 showing the top surface 36, the delivery pores 40 in the membrane 16 and the channels 34 in the membrane 16. The channels 34 are connected to the delivery pores 40. The build material 22 flows through the channels 34 to the delivery pores 40. The channels 34 and the delivery pores 40 allow the build material 22 to be uniformly distributed to form the layers of the object being formed.

Figure 2:
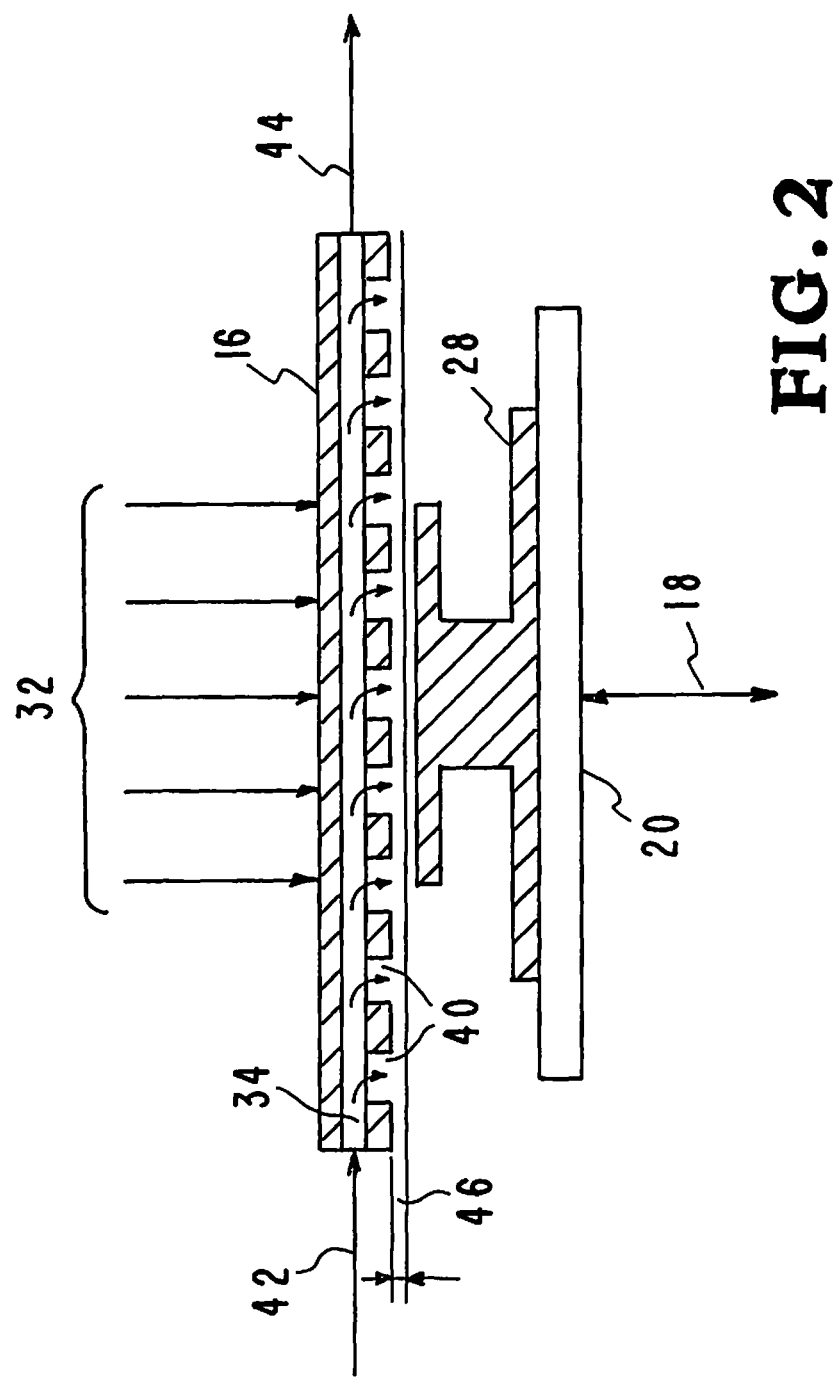
FIG. 2 is schematic depiction illustrating the stereolithography system for making a solid object by successively printing thin layers of a UV curable material, one on top of the other.

FIG. 2 is schematic depiction illustrating the stereolithography system for making a solid object by successively printing thin layers of a UV curable material, one on top of the other. The system 10 has an elevator system 18 that positions the substrate 20. The projected image 32 from a stereolithography system (not shown) passes through the membrane 16 onto the layer 46 of build material. The projected image 36 passes through the optically transparent membrane 16 and creates the layer 46 of the object being formed.

The membrane 16 is an oxygen permeable membrane that allows oxygen to enter the system. The membrane 16 is also transparent to the ultra violet light that projects the image of the object being formed. The membrane 16 includes the channels 34 and the delivery pores 40 allowing the layer 46 of build material to be uniformly distributed.

The channels 34 are connected to the delivery pores 40. This allows the build material 22 to be uniformly distributed to form the layers of the object 28 being formed. The build material flows through inlet 42 into the channels 34 to the delivery pores 40 and from the delivery pores onto the object being constructed. Excess build material is withdrawn from the system through the channels 34 and outlet port 44 to a storage area for the build material 22.

Figure 3:
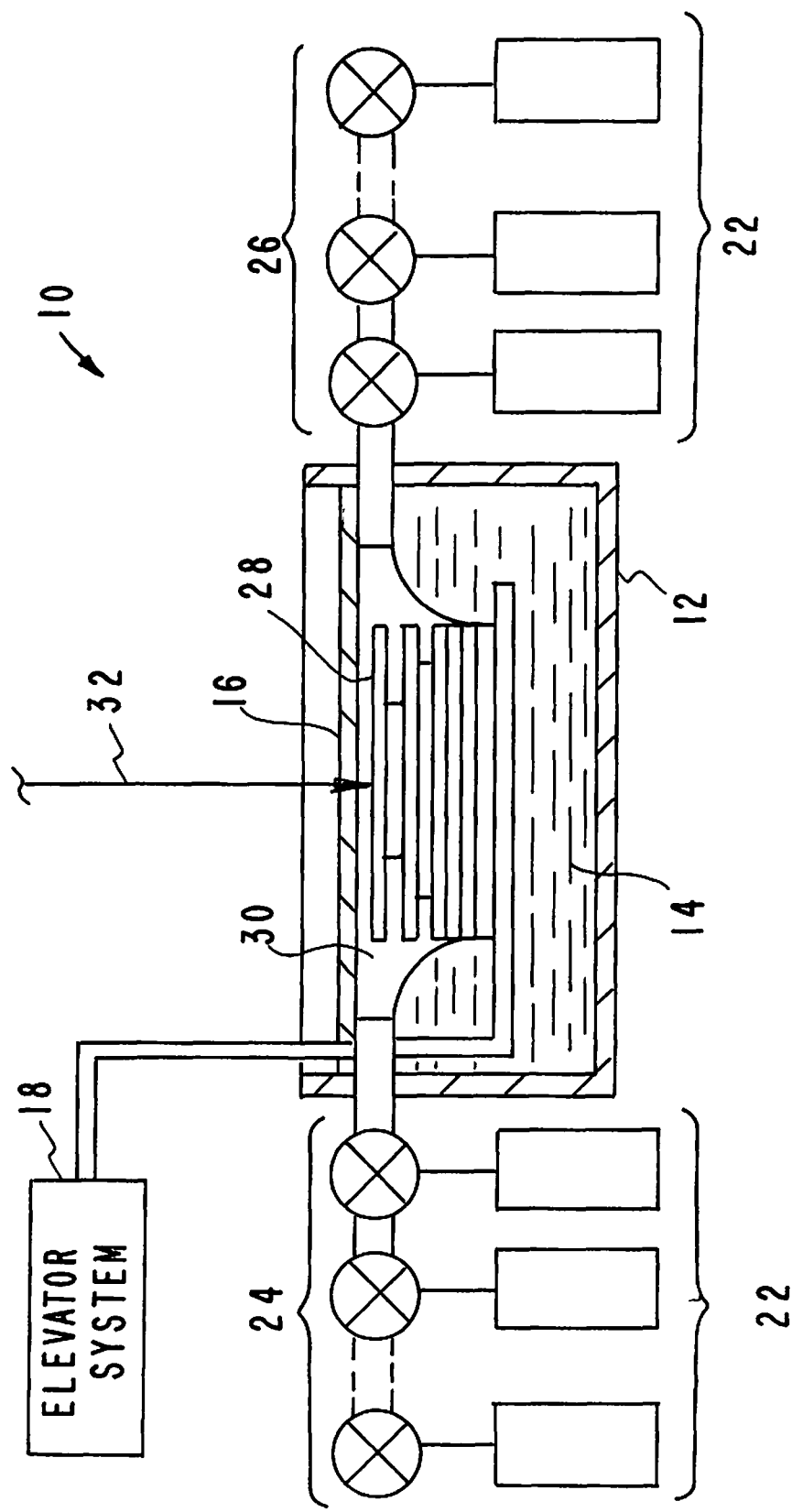
FIG. 3 is a schematic depiction illustrating the additive manufacturing apparatus, systems, and methods for making a solid object by successively printing thin layers of a UV curable material, one on top of the other.

FIG. 3 is a schematic depiction illustrating the additive manufacturing apparatus, systems, and methods for making a solid object by successively printing thin layers of a UV curable material, one on top of the other. A 3-D CAD system creates a model which is sliced into layers. The first layer is sent to a projection system and subsequently projected to the appropriate location as image on the build plane. A programmed movable spot beam of UV light shining on a surface or layer of UV curable liquid is used to form a solid cross-section of the object at the surface of the liquid. The object is then moved, in a programmed manner, away from the liquid surface by the thickness of one layer and the next cross-section is then formed and adhered to the immediately preceding layer defining the object. This process is continued until the entire object is formed.

FIG. 3 illustrates the system for making a solid object by successively printing thin layers of a UV curable material, one on top of the other. The system 10 has a reservoir 12 that is filled with an immiscible fluid 14 (oil or aqueous solution). An elevator system 18 positions a substrate 20 within the fluid 14 filled reservoir 12. Build materials 22 are delivered through valves 24 to the membrane 16. A puddle 30 of build material 22 that has been injected into the reservoir 12 has accumulated. The build material 22 will not mix with the immiscible fluid 14 so it forms a puddle 30 that floats on the fluid 14. The elevator system 18 has positioned the substrate 20 to a position that forms a thin (5-10 µm) layer of build material 22. Membrane 16 is an oxygen permeable membrane that allows oxygen to enter the system. The oxygen prevents the build material 22 from sticking to the membrane 16. The excess build material 22 is withdrawn through valves 26. A projected image 32 from a stereolithography system (not shown) passes through the membrane 16 onto the build material 22. The projected image 36 passes through the optically transparent membrane 16 and creates the layers of an object 28 being formed from build material 22.

Figure 4:
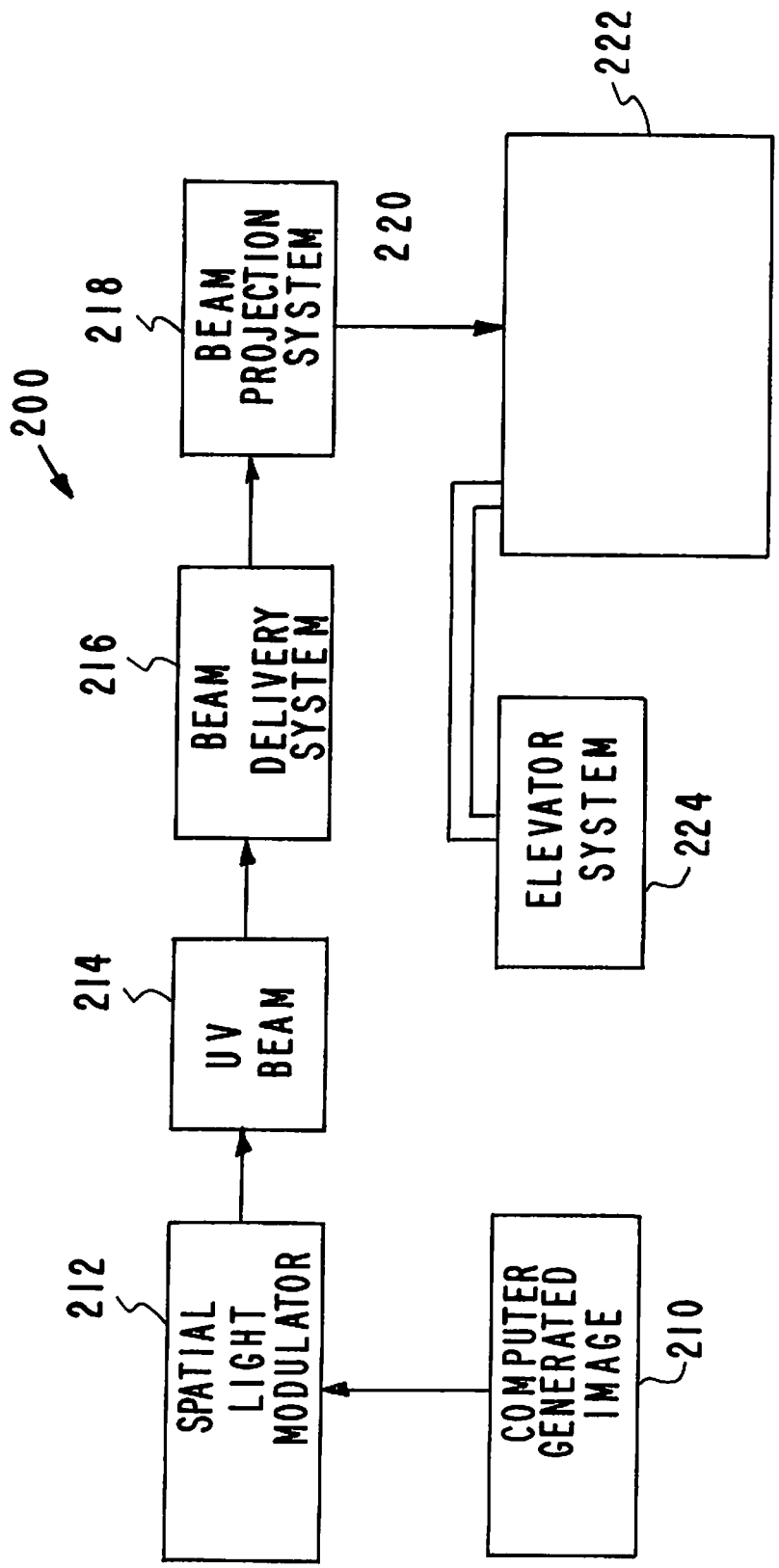
Referring to FIG. 4, an illustrative diagram further demonstrates the inventor's additive manufacturing apparatus, systems, and methods.

Referring to FIG. 4, an illustrative diagram further demonstrates the inventor's additive manufacturing apparatus, systems, and methods. This diagram is designated generally by the reference numeral 200. The diagram 200 shows a projection stereolithography system. A series of steps are illustrated in the depiction of the inventor's projection stereolithography system 200.

In the first step 210, a computer-generated image is produced. A 3D solid model of the structure to be complete is designed by any suitable method, e.g., by an algorithm or by computer aided design (CAD) software at a PC/controller. The model is electronically sliced into series of 2-dimensional data files, i.e. 2D layers, each defining a planar cross section through the 3D preform of the complex product to be constructed, and which may be individually stored.

In the next step, step 212, a digital image of the first layer is projected by a spatial light modulator. A liquid crystal on silicon (LCoS) chip can be used for the projection. The next step, step 214, is the projection of a UV beam containing the digital image of the first layer.

In the next step, step 216, a beam delivery system is used to produce a beam containing the digital image of the first layer. The next step, step 218, uses a beam projection system to project the digital image of the first layer in focus at a particular plane in a photoresist/photo-curable composition in a supporting container so that the actinic light preferentially exposes the desired layer to cure it. The projecting beam 220 is directed into the photoresist/photo-curable composition.

In the next step, step 222, the system of additive manufacturing illustrated in FIGS. 1A through 1F are used to build the structure. Step 222 utilizes an oxygen-permeable membrane to facilitate low-volume printing and high-speed resin change in a stereolithography-based 3D printer. The membrane is used to constrain the fluid surface at the focal plane of the SL printer and a carrier fluid is used to hold the fluid against the membrane. The small amount of resin is quickly switched using integrated microfluidic channels. After one layer is cured the composition and focusing optics undergo relative movement by an elevator system 224 that moves the build platform. The layer-by-layer process continues until all 3D layers of the structure are completed.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An additive manufacturing apparatus for building a structure, comprising:
   a reservoir;
   an immiscible fluid in said reservoir;

a membrane operatively connected to said reservoir;
channels and delivery ports in said membrane;
an amount of curable resin wherein said amount of curable resin is less than ten microliters;
a delivery system configured for delivering said amount of curable resin to said channels and delivery ports in said membrane and to said reservoir in contact with said immiscible fluid in said reservoir; and
an energy source adapted to deliver energy to said reservoir onto said amount of curable resin for building the structure.

* * * * *